United States Patent [19]

Braun

[11] Patent Number: 4,646,891
[45] Date of Patent: Mar. 3, 1987

[54] AUTOMATIC CLUTCH CONTROL

[75] Inventor: Eugene R. Braun, Royal Oak, Mich.

[73] Assignee: Eaton Corporation, Cleveland, Ohio

[21] Appl. No.: 696,558

[22] Filed: Jan. 31, 1985

[51] Int. Cl.$^4$ .................. F16D 43/22; F16D 13/75; B60K 41/02

[52] U.S. Cl. .................. 192/0.032; 192/0.076; 192/3.58; 192/111 A; 361/242

[58] Field of Search .............. 192/0.052, 0.076, 0.075, 192/0.092, 0.032, 3.58, 103 R, 111 A; 361/242, 243

[56] References Cited

U.S. PATENT DOCUMENTS

| | | | |
|---|---|---|---|
| 4,023,660 | 5/1977 | Dickinson | 192/0.075 |
| 4,072,220 | 2/1978 | Hamada | 192/0.076 |
| 4,081,065 | 3/1978 | Smyth et al. | 192/0.076 |
| 4,361,060 | 11/1982 | Smyth | 74/866 |
| 4,401,200 | 8/1983 | Heidemeyer et al. | 192/0.076 |
| 4,529,072 | 7/1985 | Oguma et al. | 192/0.052 |

FOREIGN PATENT DOCUMENTS

| | | | |
|---|---|---|---|
| 2080909 | 2/1982 | United Kingdom | 192/103 R |
| 2130329 | 5/1984 | United Kingdom | 192/0.032 |

Primary Examiner—Leslie Braun
Assistant Examiner—John Malcolm White
Attorney, Agent, or Firm—D. A. Rowe; H. D. Gordon

[57] ABSTRACT

An improved automatic clutch control system for controlling a vehicle master clutch (14) drivingly interposed a throttle controlled engine (12) and a change gear transmission (10) in an automatic mechanical transmission system (AMT) is provided. The control provides at least one modulated clutch engagement mode of operation wherein the clutch is moved rapidly from the fully disengaged to the incipient engagement position (A), and is then moved in a modulated manner, according to logic rules, to the fully engaged position. A monitored clutch actuator (22) parameter is compared to a reference value (C) to determine the expected point of incipient engagement of the clutch. The reference value is periodically updated, to compensate for wear and the like, by monitoring the sensed or calculated value of the monitored clutch actuator parameter at the time a monitored system parameter (108, 110) responds in a manner predictable for the instant of incipient engagement of the clutch.

2 Claims, 4 Drawing Figures

AUTOMATIC CLUTCH CONTROL

BACKGROUND OF THE INVENTION

1. Field of the Invention

The present invention relates to clutch controls for automatically controlling the engagement and disengagement of transmission master clutches and in particular relates to clutch controls for master clutches utilized with automatic mechanical transmission systems. More particularly, the present invention relates to an improved automatic clutch control system having a modulated engagement mode wherein the master friction clutch is moved rapidly from the fully disengaged position to the position of almost incipient, or about incipient, engagement and then fully engaged in a modulated manner and wherein the position of almost incipient or incipient engagement is determined by the value of a monitored clutch actuator parameter, which value is periodically updated by monitoring the changes in value of other system parameters such as engine speed and/or input shaft speed during clutch engagement operations.

2. Description of the Prior Art

Automatic mechanical transmission systems and the automatic controls for the master clutches thereof are known in the prior art as may be seen by reference to U.S. Pat. Nos. 3,478,851; 3,752,284; 4,019,614; 4,038,889; 4,081,065, 4,361,061 and 4,401,200, the disclosures of which are hereby incorporated by reference.

Briefly, in such automatic mechanical transmissions systems, various drive line operations include the supply of fuel to the engine, the engagement and disengagement of the master friction clutch, the shifting of the transmission and the operation of other devices such as input or output shaft brakes are automatically controlled by a control system, including a central processing unit, based upon certain measured, sensed, stored and/or calculated input parameters. Typically, the input parameters include engine speed, throttle position, transmission input and/or output shaft speed, vehicle speed, current engaged gear ratio, application of the brakes, condition of the clutch actuator and the like. The term throttle position is utilized to signify the position or setting of any operator controlled device for controlling the supply of fuel to an engine.

Referring specifically to the automatic clutch control, in a vehicle equipped with an automatic mechanical transmission, during normal operation, when starting from at rest or operating at a very low speed, the master friction clutch is modulated between fully disengaged and fully engaged conditions, i.e. is partially engaged, according to certain input parameters, to maintain the engine speed at a set value above idle speed and/or to achieve smooth starts. Typically, the set engine speed value is throttle position modulated to provide appropriate starting torque and the clutch is moved toward engagement and disengagement, respectively, as the engine speed increases above and falls below, respectively, the set engine speed value.

In another system, see above mentioned U.S. Pat. No. 4,081,065, the clutch is modulated in accordance with throttle position, engine speed and engine acceleration.

While the above automatic mechanical transmission systems are considered to be highly advantageous, they are not totally satisfactory as, in a modulated engagement mode, such as during a start from stop operation, the engagement of the clutch was modulated for its entire travel from fully disengaged to fully engaged condition rather than moving quickly to almost the incipient engaged condition and then modulating to full engagement and/or did not periodically measure and update the incipient engagement point to adjust for wear, out of adjustment conditions and the like and/or sensed the occurence of actual incipient engagement and thus could not cease rapid engagement until some period of time after incipient engagement occured. The term "incipient engagement" of the master clutch refers to the clutch condition wherein the friction surfaces are almost or just at the point of contact.

Movement of the clutch actuators from the fully disengaged to the incipient engagement position in any manner other than the fastest possible manner is undesireable as control of the system, i.e. control of engine and/or input shaft speed, by varying amount of clutch engagement (i.e. slip) is not possible during this portion of actuator movement and delays in achieving at least incipient engagement make closed loop control of the system more difficult. This is especially true as movement from the fully disengaged condition to incipient engagement may require up to about fifty percent (50%) of the total actuator disengagement and up to about thirty five percent (35%) of the full actuator supply pressure.

Failure to periodically monitor and update the point of incipient engagement, as determined by a monitored clutch actuator parameter such as actuator pressure and/or a lever position, is undesireable as wear of the friction surfaces and/or mechanical actuator members, misadjustments of the mechanical members, and the like, can cause a relatively large variance of the value of the actuator parameter corresponding to incipient engagement. By way of example only, in a typical automatic transmission system utilizing a fluid pressure applied, spring released clutch actuator mechanism, about 60 psig actuator pressure is required to fully engage the clutch and about 25 psig actuator pressure is required to reach the point of incipient engagement. It has been found that the pressure to reach incipient engagement may vary by as much as 5-6 psig during operation of the system before manual adjustment of the clutch is required.

An automatic clutch control system including means to move the controlled friction clutch from the fully disengaged condition towards the fully engaged condition as rapidly as possible, until sensing actual initial engagement of the clutch friction linings, is disclosed in above-mentioned U.S. Pat. No. 4,401,200. While this prior art system is an improvement over the previously existing systems, this system is not totally satisfactory as actual initial clutch engagement must occur and be sensed to initiate a change from the most rapid to a modulated engagement mode of operation and thus, due to sensing and change in mode of operation delays, the rapid clutch engagement is not limited to the free travel take-up only. Also a value of a monitored clutch actuator parameter, such as actuator pressure and/or lever position, corresponding to expected initial or incipient engagement is not set. Such a value, in addition to permitting most rapid clutch engagement to occur only until just prior to expected incipient engagement, provides a parameter which can be updated and compared to previously determined values to sense system damage and/or operating errors.

SUMMARY OF THE INVENTION

In accordance with the present invention, the drawbacks of prior art have been overcome or minimized by the provision of an automatic master friction clutch control system, preferably for use in an automatic mechanical transmission system, which has a modulated engagement mode of operation wherein the clutch actuators cause the clutch to move rapidly to the position of incipient, or preferably almost incipient, engagement and then move the clutch to a fully engaged position in a modulated manner in accordance with sensed, stored and/or calculated inputs and predetermined logic rules. The point of expected incipient engagement is determined by the value of a monitored clutch actuator parameter and is updated periodically to compensate for wear and the like.

The above is accomplished by establishing logic rules for the clutch actuator control in the modulated engagement mode, or modes, of operation wherein the clutch is moved in a rapid, unmodulated manner to the point of incipient, or preferably almost incipient engagement by causing the clutch actuator to assume a position or condition, as determined by the value of a monitored parameter such as actuation fluid pressure and/or a lever position, corresponding to almost the point of incipient engagement. The value of the monitored clutch actuator parameter corresponding to incipient engagement of the clutch is periodically updated by monitoring the values, or rate of change of values, of certain system parameters, such as engine speed and/or input shaft speed, which behave in a predictable manner at the time of incipient clutch engagement, and utilizing the value of the monitored clutch actuator parameter at the time of occurrence of the system parameter behaving in the manner expected at incipient engagement as the current, updated value of the actuator parameter corresponding to clutch incipient engagement.

By way of example, in a given mode of clutch operation, a selected monitored system parameter, such as the rate of change of engine speed, will react in a predictable manner, such as exceeding an experimentally determined reference value, at the occurence of incipient clutch engagement. By monitoring the value of a clutch actuator parameter, such as clutch actuating pressure, and storing the value of the clutch actuating parameter at the moment the monitored system parameter reacts in the manner indicative of incipient clutch engagement, an updated clutch actuator parameter value at expected incipient engagement is obtained. The clutch may then be caused to assume almost the expected incipient condition in a rapid unmodulated manner without overshooting the point of incipient engagement.

Accordingly, it is an object of the present invention to provide an automatic clutch control system, preferably for an automatic mechanical transmission system, wherein the control has a modulated engagement mode wherein the clutch is caused to move rapidly in an unmodulated manner from the fully disengaged to almost the incipient engagement position, wherein the point of incipient engagement is determined by comparison of a control parameter value to a reference value, and wherein the reference value of the control parameter utilized as an indication of the incipient engagement position of the clutch is periodically updated to compensate for wear and the like.

This and other objects and advantages of the present invention will become apparent from a reading of the detailed description of the preferred embodiment taken in connection with the attached drawings.

DESCRIPTION OF THE PREFERRED EMBODIMENT

Figure 1:
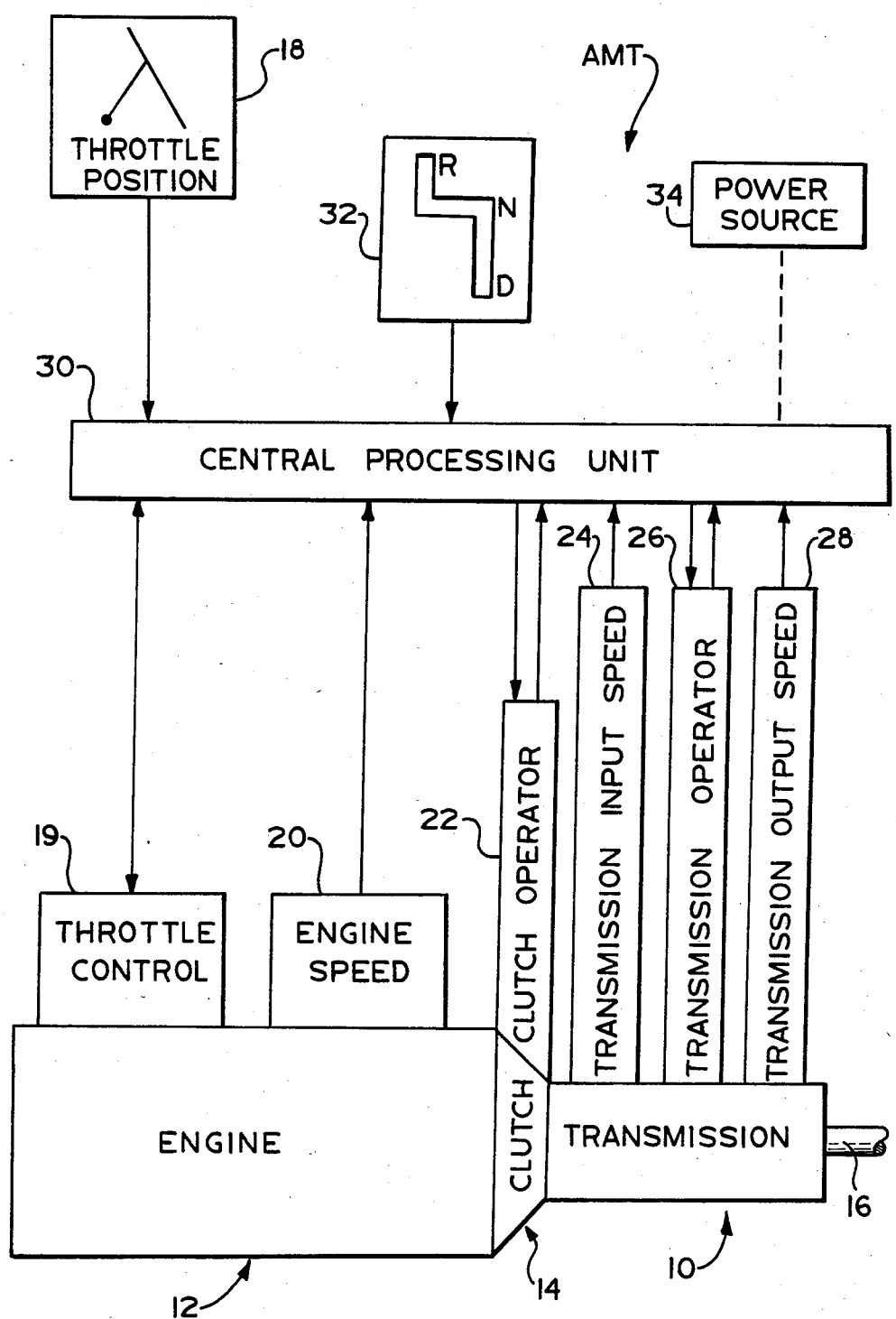
FIG. 1 is a schematic illustration of an automatic mechanical transmission control system of the type advantageously utilizing the automatic clutch control system of the present invention.

In FIG. 1, an automatic mechanical transmission system, AMT, comprising an automatic multi-speed change gear transmission 10 driven by a throttle controlled heat engine 12, such as a well known diesel engine, through an automatically controlled master clutch 14 is illustrated. While the improved automatic master clutch control system of the present invention, to be described in greater detail below, is especially well suited for use in connection with automatic mechanical transmission systems of the type illustrated, it is understood that the automatic clutch control system of the present invention is also suitable for use with semi-automatic and/or manually shifted change gear transmissions and the like.

Typically, automatic mechanical transmission systems of the type illustrated are utilized with vehicles and the output of the automatic transmission 10 is output shaft 16, which is adopted for driving connection to an appropriate vehicle component such as the differential of a drive axle, a transfer case, or the like as is well known in the prior art. The above mentioned drivetrain components are acted upon and monitored by several devices each of which will be discussed in greater detail below. These devices include a throttle position monitor assembly 18 which senses the position or setting of the operator controlled vehicle throttle pedal or other fuel throttling device, a throttle control device 19 which controls the supply of fuel to the engine, an engine speed sensor 20 which senses the rotational speed of the engine, a clutch operator or actuator 22 which engages and disengages master clutch 14, a transmission input shaft speed sensor 24, a transmission operator 26 which is effective to shift the transmission 10 into a selected gear ratio, and a transmission output shaft speed sensor 28.

The above mentioned devices supply information to and/or accept commands from a central processing unit 30. The central processing unit 30 may include analog and/or digital electronic calculation and logic circuitry, preferably microprocessor based, the specific configuration and structure of which, forms no part of the present invention. The central processing unit also receives information from a shift control assembly 32 by which the operator may select a reverse (R), neutral (N) or forward (D) mode of operation of a vehicle. An electrical power source 34 and/or a source of pressurized fluid (not shown) provides electrical and/or pneumatic power to the various sensing, operating and/or processing units. Drive train components and controls therefore, of the type described above, are known in the prior art and may be appreciated in greater detail by reference to above mentioned U.S. Pat. Nos. 4,478,851; 4,019,614; 4,038,889; 4,081,065; 4,361,061 and 4,401,200.

In the illustrated embodiment the central processing unit 30 receives direct inputs from sensor 20 indicating the present engine speed, from sensor 24 indicating the present transmission input shaft speed, from sensor 28 indicating the present transmission output shaft speed, from sensor 32 indicating the mode of operation selected by the vehicle operator, from clutch operator 22 indicating the condition of clutch 14 and from transmission operator 26 indicating the condition of transmission 10. In addition to these direct inputs, the central processing unit 30 may be provided with circuitry whereby the signal from sensor 18 may be differentiated to provide a calculated signal indicative of the rate of change of throttle position, a circuit for differentiating the input signal from sensor 20 to provide a calculated signal indicative of the rate of acceleration of the engine, a circuit for differentiating the signal from sensor 24 to provide a calculated signal indicative of the rate of acceleration of the input shaft, means to compare the input signals from sensors 24 and 28 to calculate a current engaged gear ratio, circuit means to compare the input signals from sensor 20 and sensor 24 to calculate slip across the clutch 14 and means to sense full release of the throttle. Full release of the throttle may be sensed by a separate switch or the like or may be sensed by a minimum value (i.e. 0% of full throttle) signal from sensor 18. The central processing unit may also comprise memory means for storing current input and/or calculated information and means for clearing the memory means upon the occurrence of a predetermined event.

Sensors 18, 20, 24, and 28 and the sensors associated with operators 22 and 26, may be of any known type or construction for generating analog or digital signals proportional or indicative to the parameter monitored thereby. Similarily, operators 19, 22 and 26, may be of any known electrical, mechanical, pneumatic or electro-pneumatic type for executing operations in response to command signals from processing unit 30.

As is known, the purpose of the central processing unit is to select, in accordance with a program, the optimal gear ratio at which the transmission should be operating and if necessary to command a gear change, or shift, into the selected optimal gear ratio based upon the current and/or stored information. The commands comprise commands to the transmission operator 26 to engage a desired gear ratio, to throttle control 19 to control the speed of the engine and to clutch operator 22 for proper operation of master clutch 14.

Figure 2:
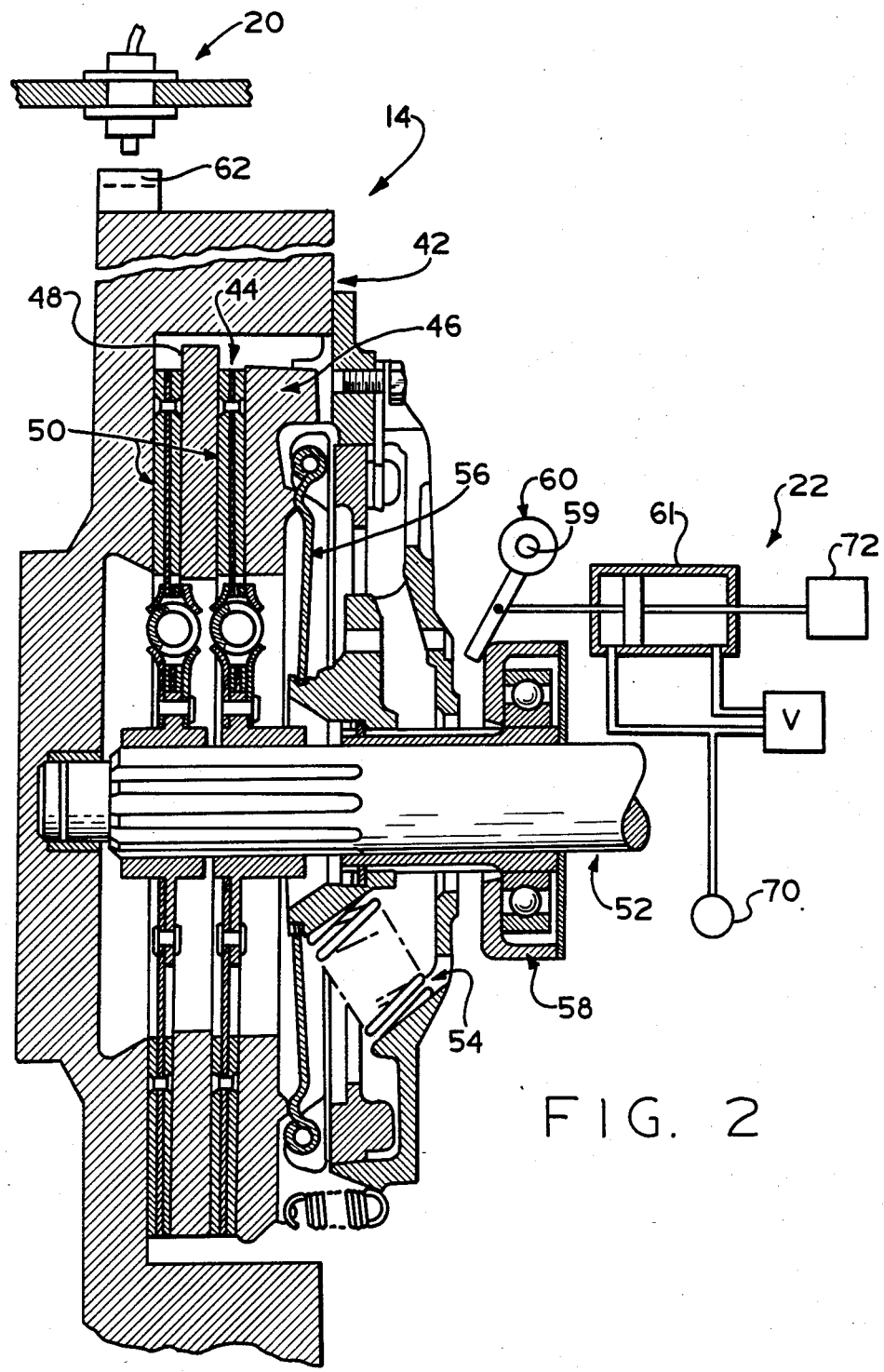
FIG. 2 is a cross sectional view of a typical master friction clutch of the type automatically controlled by the present invention.

A typical master friction clutch 14 of the type to be automatically controlled by the automatic clutch control system of the present invention may be seen by reference to FIG. 2. It is understood, of course, that the specific construction of the clutch and actuator therefore are shown for illustrative purposes and that the control system of the present invention is suitable for use in connection with clutches and/or operators therefor of differing structure. Clutch 14 illustrated is a typical two plate mechanical spring applied clutch which is mounted to an engine fly wheel 42. Internal lugs 44 on the inner radius of the fly wheel 42 correspond to slots in the clutch pressure plate 46 and intermediate plate 48 causing these elements to rotate at engine speed. They are, however, free to move in an axial direction. Clutch driven discs 50 are splined to the transmission input shaft 52. Clutch torque is provided by engaging springs 54 acting through levers 56 to apply a pressure to pressure plate 46. This pressure squeezes the driven discs 50 and intermediate plate 48 between the pressure plate 46 and the engine fly wheel 42. The magnitude of the clutch torque is proportional to this pressure.

The force provided by the spring 54 on the pressure plate 46 can be controlled by the axial position of the throw out bearing assembly 58. Throw out bearing assembly 58 can be moved in the axial direction by a control lever 60 mounted on a shaft 59. The shaft 59 is mounted in a clutch housing such that pivotal movement of the clutch control lever 60 will cause an axial movement of the throw out bearing assembly 58. In this manner, movement of control lever 60 can vary the force on pressure plate 46 and therefore the available clutch torque. A magnetic pickup 20 is mounted in the clutch housing and detects tooth passage of the gear teeth 62 located on the outer radius of the engine fly wheel 42 to provide a signal proportional to engine speed.

Pivotal movement of the control lever 60 is controlled by a piston, cylinder and control valve assembly 61. Lever 60 and assembly 61 comprise the clutch actuator 22. Control valve V may, as disclosed in above-mentioned U.S. Pat. Nos. 4,081,065 and 4,361,060, comprise fine and course ports for modulated and rapid movement of lever 60. A sensor 70 for sensing clutch actuator pressure and/or a sensor 72 for sensing lever/piston position may be provided for providing input signals to CPU 30.

The automatic clutch control system of the present invention, when utilized in connection with an automatic mechanical transmission system, comprises a portion of the central processing unit 30. As indicated above, the clutch control system of the present invention may be separate and distinct from any transmission control devices. The central processing unit may utilize discrete logic components or a programmed (by means of software and/or firmware) microprocessor. If a microprocessor is utilized, the discrete logic components/circuits, such as comparators, etc., are replaced by algorithm routines, etc., as is known in the prior art.

The automatic clutch control system of the present invention is provided to automatically control the master friction clutch 14 connecting an engine 12 to a mechanical change gear transmission 10. Change gear transmissions are well known in the prior art and an example thereof may be seen by reference to U.S. Pat. No. 3,105,395, the disclosure of which is hereby incorporated by reference. The automatic clutch control system of the present invention controls operation of the clutch to engage and disengage same in accordance with certain current and/or stored parameters and logic rules. The automatic clutch control system preferably, will be similar to the clutch control systems illustrated and described in above mentioned U.S. Pat. Nos. 4,401,200; 4,361,060; 4,081,065 and/or 3,752,284.

The automatic clutch control will typically have several modes of operation, namely, a start from stop mode of operation wherein the clutch is engaged in a modulated manner and several gear change modes of operation when a vehicle transmission is shifted with the vehicle moving at above a given rate of speed. Typically, in the gear shift mode of operation, the master clutch is automatically caused to fully disengage at the initiation of a gear shift operation and automatically caused to fully re-engage at the completion of a gear shift operation at a rate of travel and/or slip which may be modulated or unmodulated. A considerably greater degree of control, as is well known in the prior art, is required for operation of the clutch in the start from stop mode of operation.

Typically, in the start from stop mode of operation, the master clutch must be modulated between a fully disengaged and a fully engaged condition, or maintained at a predetermined partially engaged condition, in accordance with certain parameters which usually include at least engine speed and throttle position, to achieve an acceptably smooth start without stalling of the vehicle engine. During a start from stop operation, the clutch is often maintained in a variably partially engaged condition, i.e. allowed a predetermined amount of slip, to maintain the engine speed and/or engine acceleration at above a predetermined value, which value is typically determined by engine idle speed and throttle position. Typically, the predetermined value is proportional to sensed throttle position expressed as a percentage of wide open throttle.

In the gear shift modes of operation, if the drive line is engaged, the clutch is typically engaged in a modulated manner to achieve smooth engagement. During a downshift, when the clutch is engaged with the drive line disengaged to utilize the engine to increase the input shaft speed to a synchronous speed for the transmission gear ratio being engaged (i.e. similar to the manual transmission double clutch operation), the clutch is typically engaged in a rapid, ummodulated manner.

In the modulated modes of clutch engagement, especially in the start from stop mode of operation, the clutch 14 is utilized as an essential control element of the AMT system. As the clutch 14 can exercise no control over the system during that portion of engagement when it moves from the fully disengaged to the incipient engagement position, it is highly desireable to move the clutch as rapidly as possible between these positions during a modulated clutch engagement operation and to then control the degree of engagement of the clutch in a modulated manner, according to sensed, calculated and/or stored inputs and logic rules from the incipient engagement to fully engaged conditions thereof. As the sensing of actual incipient engagement of the clutch, and switching the actuator from the rapid unmodulated to the modulated modes of operation requires a period of time, it is highly desireable to have an accurate means to predict the conditions at which incipient engagement will occur, and to switch the actuator from the rapid unmodulated to the modulated mode of operation just prior to the occurence of the predicted condition. To achieve the above, the control must have an accurate means to determine the clutch actuator 22 condition corresponding to the clutch incipient engagement condition.

Figure 3:
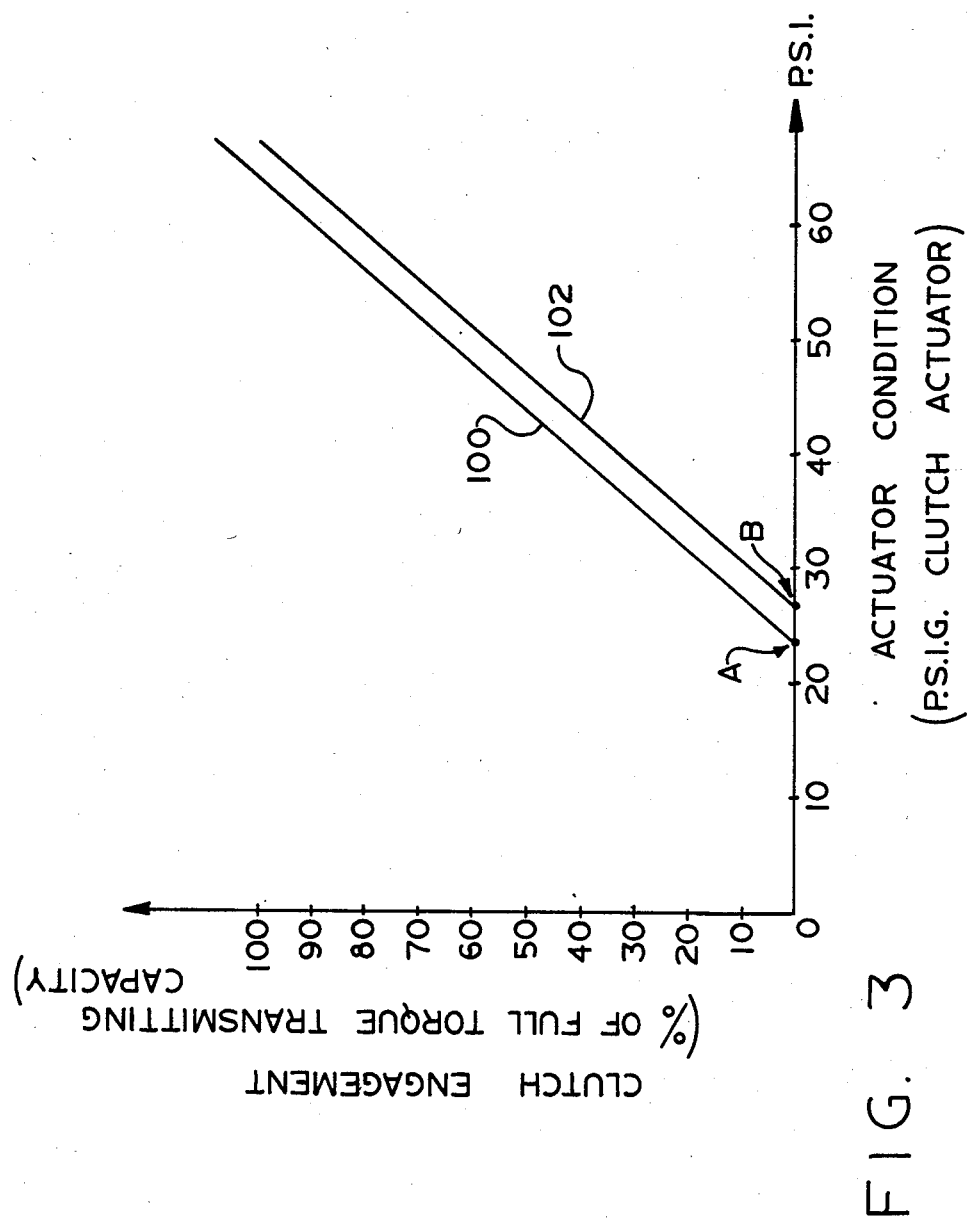
FIG. 3 is a graphical illustration of variable clutch engagement at various values of a monitored clutch actuator parameter.

As may be seen by reference to FIG. 3, the condition of the clutch, or amount of clutch engagement, expressed as a percentage of torque transfer capacity at full clutch engagement, may be related to a monitored clutch actuator parameter, such as position (angular offset) of lever 60, actuator fluid pressure in piston/cylinder assembly 61, axial position of assembly 61 piston member, or the like. In FIG. 3, for purposes of example, the monitored actuator parameter is fluid pressure in actuator piston/cylinder assembly 61 expressed in psig.

In FIG. 3, solid line 100 represents a clutch 14 with little or no wear and substantially perfect adjustment. As may be seen, a pressure of about 23 psig is required to reach point A, the point of incipient engagement. Line 102 represents a clutch with considerable, but allowable, wear and/or with considerable, but allowable, misadjustment. As may be seen, for such conditions, the point of incipient engagement B occurs at about 27 psig actuator pressure. Of course, simple physical differences in the manufacture of the clutch and/or actuators and/or sensors may result in similar differences.

To achieve proper improved control of the clutch, it is highly desireable to have control devices for, and a method of, periodically measuring the value of the monitored actuator parameter, or parameters, corresponding to incipient clutch engagement conditions. Preferably, this reference value will be measured and/or calculated (i.e. updated) once every predetermined number of clutch engagement cycles and stored for use by the control unit 30 until updated.

Figure 4:
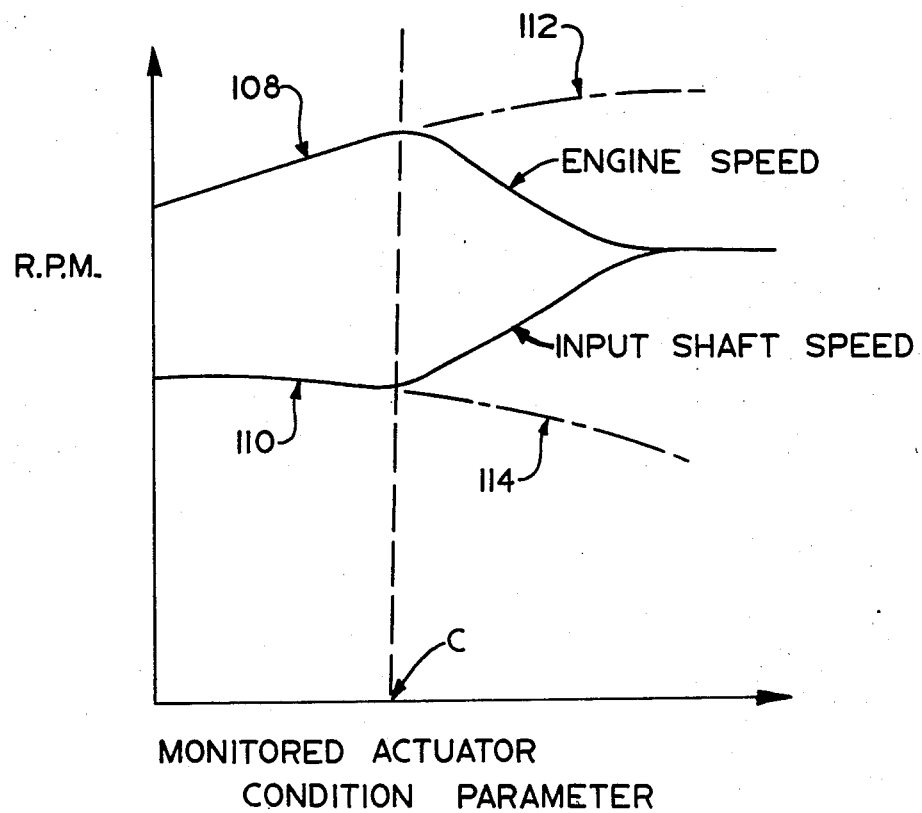
FIG. 4 is a graphical illustration of monitored system parameter values and monitored clutch actuator parameter values during an unmodulated clutch engagement operation.

One method of measuring (or calculating) the current value of a monitored clutch actuator parameter corresponding to incipient clutch engagement is graphically illustrated in FIG. 4. In FIG. 4, engine speed 108 and input shaft speed 110 are illustrated at various actuator condition parameter (lever position, actuator pressure, time of actuator initiation, etc.) values during an ummodulated clutch engagement, such as clutch engagement to increase the input shaft speed by use of the engine to synchronize nonengaged jaw clutches during a downshift. Dotted lines 112 and 114, respectively, represent the expected values of engine speed and input shaft speed, respectively, in the absence of a clutch engagement. For purposes of this example, in a non-modulated clutch engagement, the increase in actuator parameter value may be considered to be constant with time.

As may be seen, at a given time and at a value C of the monitored actuator condition parameter, the value, or the rate of change of the value, of the monitored system parameter, input shaft and/or engine speed, will change in a manner associated with (i.e. predicted for) incipient clutch engagement. Typically, the monitored change in value, or change in the rate of change in value, of the monitored system parameter will be compared to a reference change value. When the monitored change value equals the reference change value, the current monitored actuator condition parameter value, C, will be stored as the value corresponding to incipient clutch engagement.

Accordingly, as may be seen, an automatic clutch control system, preferably for use in connection with a vehicle equipped with an automatic mechanical transmission system, is provided which includes logic for engaging the clutch in a modulated manner including moving the clutch from the fully disengaged to the incipient engagement position rapidly and then fully engaging the clutch in a modulated manner. The point of incipient, or preferably almost incipient, clutch engagement is achieved by commanding the clutch actuator to assume a condition wherein one or more of the monitored/controlled actuator parameters is caused to assume a value corresponding to incipient, or preferably almost incipient, clutch engagement, which value is periodically updated by monitoring of selected system parameters, such as engine and/or input shaft speed, which behave in a predictable manner at incipient clutch engagement.

Although, the present invention has been set forth with a certain degree of particularity, it is understood that various modification and substitution and rearrangement of the components are possible without departing from the spirit and the scope of the invention as hereinafter claimed.

I claim:

1. A method for automatically controlling the operation of a master friction clutch in a vehicle automatic mechanical transmission system of the type comprising an automatic mechanical transmission, a throttle device controlled heat engine, a master clutch interposed the engine and transmission and a control system including means for receiving sensed or calculated input signals indicative of clutch, engine and transmission operating condition, means for processing said input signals in accordance with predetermined logic rules, and means for providing output signals to command the operation of a clutch actuator means to manipulate said clutch to a first fully engaged condition, a second fully disengaged condition and a third partially engaged condition, said control system having at least one mode of operation for causing said clutch to assume said fully engaged condition in a modulated manner in accordance with said input signals and predetermined logic rules, said one mode including causing said actuator to manipulate said clutch from the second fully disengaged to about the incipient engagement position thereof in a nonmodulated rapid manner and then manipulate said clutch from the incipient engagement position to the fully engaged condition thereof in a modulated manner in accordance with said logic rules; said method characterized by:
   determining the incipient engagement position of said clutch by:
   sensing the current value of a first parameter indicative of clutch actuator condition;
   monitoring the value of a second parameter indicative of the rate of the rate of change of engine speed;
   selecting a first reference value equal to the predicted value of said second parameter at the time of incipient engagement of said clutch;
   determining the value of said first parameter at the time of the value of said second parameter equaling said first reference value;
   periodically setting a second reference value to the value of said first parameter at the time or the value of said second parameter equaling said first reference value;
   storing data including at least the most recently determined second reference value; and
   comparing said current value of first parameter to said second reference value.

2. The improved clutch control method of claim 1, wherein said means for providing logic rules provides logic rules for a second mode of operation whereby said actuator manipulates said clutch from the second fully disengaged condition to the first fully engaged condition in an unmodulated manner, said second reference value determined only during operation of said clutch in said second mode of operation.

* * * * *